United States Patent [19]

Tamba et al.

[11] Patent Number: 4,801,343
[45] Date of Patent: Jan. 31, 1989

[54] METHOD FOR MANUFACTURING A CASE HAVING MULTIPLE WALLS

[75] Inventors: Shinichi Tamba; Noboru Fukui, both of Kakogawa, Japan

[73] Assignee: Kawasaki Jukogyo Kabushiki Kaisha, Japan

[21] Appl. No.: 94,072

[22] Filed: Sep. 4, 1987

Related U.S. Application Data

[63] Continuation of Ser. No. 721,456, Apr. 9, 1985, abandoned.

[30] Foreign Application Priority Data

Apr. 13, 1984 [JP]  Japan .................. 59-75423

[51] Int. Cl.$^4$ ............ B32B 31/26; B32B 31/28; B65B 7/16
[52] U.S. Cl. .................. 156/69; 156/274.2; 156/274.4; 156/304.2; 156/304.3; 156/304.6; 156/309.6
[58] Field of Search ............ 156/69, 91, 272.2, 272.4, 156/273.7, 273.9, 274.2, 275.1, 290, 292–293, 303.1, 304.1, 304.2, 304.6, 304.3, 308.2, 309.6, 308.4, 274.4; 220/359; 429/163, 185; 29/463

[56] References Cited

U.S. PATENT DOCUMENTS

| | | | |
|---|---|---|---|
| 3,507,735 | 4/1970 | Chisholm | 156/272.4 |
| 3,561,982 | 2/1971 | Oeth | 220/359 |
| 4,025,378 | 5/1977 | Amsden | 156/275.1 |
| 4,574,026 | 3/1986 | Winther | 156/274.4 |

Primary Examiner—Merrell C. Cashion, Jr.

[57] ABSTRACT

A method for manufacturing a multiple-wall synthetic-resin case having vertical multiple walls. The case is manufactured by integrating both upper and lower halves into one piece by jointing together; more specifically, each of the vertical walls is manufactured by jointing the upper wall formed in the upper half to the corresponding lower wall formed in the lower half. The jointing portions of the respective pairs of mating vertical walls are provided with different elevations so that they form their individual closed loops on the respective planes of elevations different from each other, conductive wire is inserted between the jointing surfaces of the upper and lower wall halves at each mating portion and apply high-frequency-heating to the conductive wire for welding the jointing surfaces.

1 Claim, 2 Drawing Sheets

METHOD FOR MANUFACTURING A CASE HAVING MULTIPLE WALLS

This application is a continuation of application Ser. No. 721,456, filed Apr. 9, 1985, now abandoned.

BACKGROUND OF THE INVENTION

This invention relates to a method for manufacturing a synthetic resin case having multiple wall construction. In general, parts integrally made from synthetic resin including polyethylene or polypropylene are manufactured by welding synthetic resin because it cannot be bonded with adhesives. One of the prior art is a welding process in which two synthetic resin parts to be jointed are faced opposedly on either side of a steel plate and pressed together to the steel plate, and then said steel plate is heated and quickly removed to complete jointing the parts while the jointing surfaces of the two resin parts are melted. However, this method is not suitable for jointing parts having complex shape. For instance, assuming that a case having vertical multiple walls is manufactured, the method has difficulties because said method cannot be applied to inner jointing walls of the case if any elevation of inner jointing portions are different from that of the outermost jointing portions, and yet even if identical, uniform welding cannot be expected because of longer distance for the plate to be pulled away.

SUMMARY OF THE INVENTION

It can be said that the purpose and object of this invention is to provide a method which eliminates said drawbacks of the prior art and is easy and efficient in manufacturing a synthetic resin case having multiple wall construction.

To achieve aforesaid purpose in manufacturing a multiplewall synthetic-resin case which has multiple closed looped vertical walls respectively spaced apart from each other at least one inner vertical wall being surrounded by an outer vertical wall, and which originally in manufacturing has the upper and lower halves and is manufactured by integrating both halves into one piece by jointing together; more specifically, each of said vertical walls is manufactured by jointing the upper wall formed in said upper wall half to the corresponding lower wall formed in said lower wall half, a method according to the invention is characterized by the steps of: providing the jointing portions of each pair of mating vertical walls, said jointing portions being disposed at a location which is apart from the top and bottom of said vertical walls and with different elevations so that they form their individual closed loops on the respective planes of elevations different from each other; inserting conductive wire between the jointing surfaces of the upper and lower wall halves at each mating portion; and applying high-frequency-heating to the conductive wire for welding said jointing surfaces. Since the high frequency heating of conductive wires inserted between the jointing surfaces of said vertical walls is performed by winding a high-frequency helical coil around the case, it provides easy manufacturing of a multiple-wall case which has been otherwise difficult in manufacturing by the prior art. In addition, since said jointing surfaces are so arranged as to locate their closed loops on planes having different elevations, one high-frequency heating enables a plurality of vertical walls to be melted simultaneously for welding, thus enhancing work efficiency.

DETAILED DESCRIPTION OF THE PREFERRED EMBODIMENT

The following drawings depict in detail an embodiment according to the invention applied to the manufacturing of a synthetic-resin fan housing in small engines.

Figure 1:
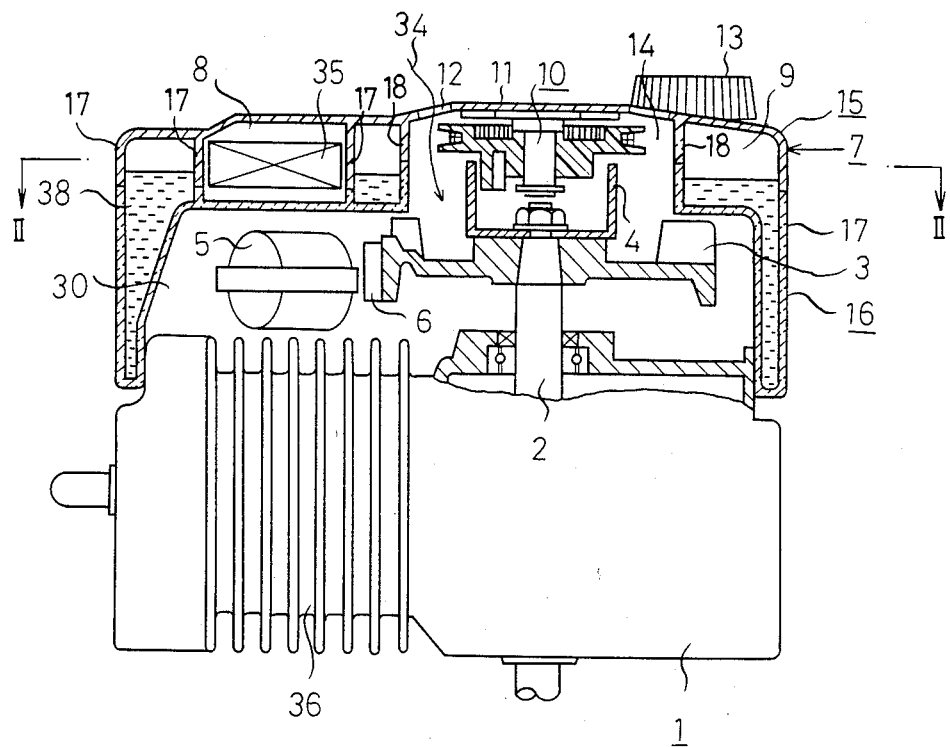
FIG. 1 is a partly exploded side view of an embodiment for a multiple-wall case manufactured according to the invention.
Figure 2:
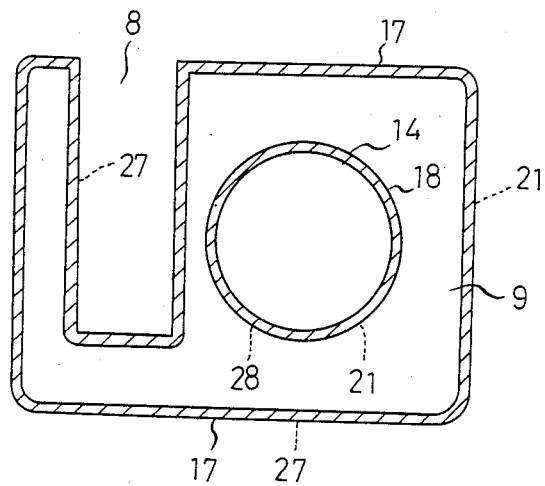
FIG. 2 is a sectional view taken along line II—II in FIG. 1.

FIG. 1 is a partly exploded front view of a general-purpose vertical engine equipped with a fan housing consisting of a multiple-wall case. In this drawing, Numeral 1 is an engine body and Numeral 2 is a crankshaft, on which an engine cooling fan 3 and a driven pulley 4 are secured where the crankshaft projects out above the engine body 1. Numeral 5 is an ignition coil 5, which is placed opposed to a permanent magnet 6 arranged on the periphery of the engine cooling fan 3. Numeral 7 is a fan housing which is made from synthetic resin and manufactured by the method in accordance with the invention, which covers the engine cooling fan 3 along with said driven pulley 4 and the ignition coil 5. As shown in FIG. 2, the fan housing is of double wall construction comprising two outer and inner vertical walls respectively 17 and 18, which form a fuel tank 9 between them. A recess on the outside of the wall 17 forms an air cleaner chamber 8, which incorporates an air cleaner element 35 in it. As shown in FIG. 1, the central hollow space 14 surrounded by the vertical wall 18 accomodates a recoil starter 10 which drives the driven pulley 4, and further in the top cover of the central space 14 a number of engine cooling intake ports 12 are opened, and said fuel tank 9 surrounds the central hollow space 14. Numeral 13 is a tank cap.

Contrary to the single construction in use for common fan housings, said fan housing 7 adopts the double wall construction which utilizes the central hollow space as the fuel tank 9. This double wall construction not only helps enhance rigidity but also prevents trembling noise from occurring at the fan housing 7, because fuel 38 in the fan housing 7 absorbs engine vibration. Incorporation of the fuel tank 9 into the fan housing 7 makes engine appearance better because no fuel tank exists at the outside. Further, drawn into a cooling air passage 30 through the engine cooling air intake ports 12 in the central top cover of the fan housing 7, engine cooling air 34 cools a cylinder portion 36 of the engine body 1 as well as positively cools the fuel 38 in the fuel tank 9, resulting in prevention of heating the fuel 38.

Figure 3:
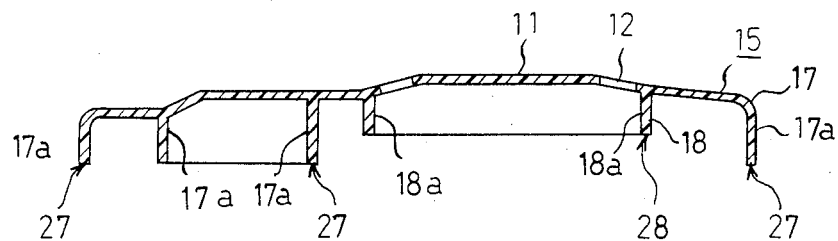
FIG. 3 is a sectional view of the case disassembled into an upper and lower half.
Figure 3:
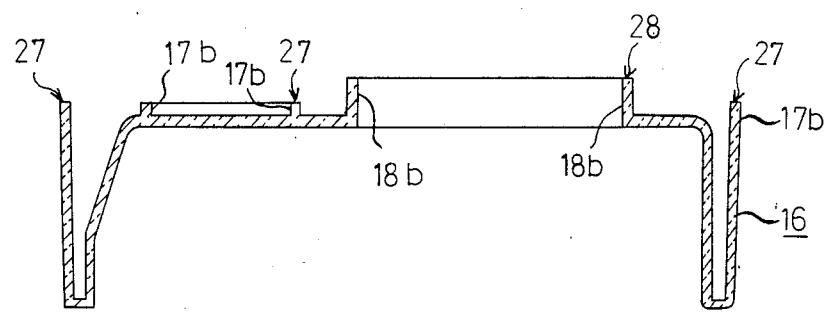
Figure 4:
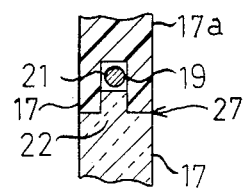
FIG. 4 is an enlarged sectional view showing the weldment of the case.

Now we explain the manufacturing process of said fan housing according to the invention, using FIG. 3 and 4. In FIG. 3, Numeral 15 is the upper half of the housing having an oil port (not shown) in the top, Numeral 16 is the lower half of the housing, the upper half 15 is made of opaque resin for weatherability and the lower half 16 is made of transparent resin for visibility of the internal fuel 38. Upper walls 17a and 18a integrally formed into the said upper half 15 are respectively jointed to corresponding lower walls 17b and 18b also integrally formed into said lower half 16 at jointing portions 27 and 28 to complete the vertical walls 17 and 18. Said jointing portions form respectively closed loops (see FIG. 2), locating on the planes of different elevations from each other.

As one jointing portion 27 is represented in FIG. 4, grooves 19 are made respectively in the jointing portions 27 and 28 of the upper walls 17a and 18a. In this groove 19 in the jointing portion 27, conductive wire 21 is inserted to form a closed loop (see FIG. 2) and a tongue 22 formed out of the lower wall 17b is fit to locate the upper half 15 and the lower half 16. If a high-frequency coil approaches said conductive wire 21 under this condition, induction current will occur in the conductive wire 21 and heat the wire (what is called induction heating will take place). The heat generated will melt said groove 19 and the tongue 22 both made of resin, resulting in a jointing portion of both the upper wall 17a and the lower wall 17b being welded together all around into one-piece vertical wall 17. Alternatively to the above explanation, a groove 19 can be made in the lower wall 17b and a tongue 22 can be formed out of the upper wall 17a.

In said configuration, since the jointing portions 27 and 28 of the vertical walls 17 and 18 constituting a double wall construction form respective closed loops (see FIG. 2), high-frequency heating of conductive wires 21(see FIG. 4) inserted into said jointing portions 27 and 28 provides easy welding of a double wall construction. In addition, since said jointing portions 27 and 28 are located on planes having different elevations to form closed loops, only-one-time high-frequency heating provides for simultaneous welding of both the two jointing portions 27 and 28, thus enhancing work efficiency.

In said embodiment, welding of the jointing portions 27 and 28 is performed in the grooves of tongue-and-groove joints consisting of the tongues 22 and the grooves 19 as shown in FIG. 4, so that it assures fine appearance of jointing portions.

Again, in said embodiment, a tongue-and-groove joint is adopted to align the upper half 15 and the lower half 16, but locating members can be alternatively installed for alignment. Applications of the invention is not limited only to the construction of said fan housing, but can be extended to, for instance, air cleaner cases and other engine-associated cases as well as general industrial parts having construction of multiple-wall synthetic-resin case, such as heat insulating cases, cooling containers and other household utensils. This invention also provides for manufacturing triple or even more multiple walls, more complicated than that shown in the embodiment, and for horizontal multiple wall also.

What is claimed is:

1. A method for manufacturing a case which has at least one closed looped inner vertical wall and a closed looped outer vertical wall, the former being surrounded with the latter, respectively spaced apart from each other, and which originally in manufacturing has an upper and a lower half and is manufactured by integrating both halves into one piece by jointing together, wherein each of said closed looped vertical walls is manufactured by jointing a closed looped upper wall formed in said upper half to a corresponding closed looped lower wall formed in said lower half, comprising the steps of: providing the jointing portions of each pair of mating closed looped vertical walls with a tongue-and-groove joint wherein a conductive wire for high-frequency-heating is to be inserted between end surfaces of the tongue and groove, each jointing portion for a respective vertical wall being disposed at a location which is apart from the top and bottom of said vertical wall respectively, the locations for the jointing portions of said inner and outer vertical walls being at different planes of elevations with respect to each other; inserting conductive wire between the jointing surfaces of the corresponding closed looped upper and lower walls at each jointing portion; and applying a one time high-frequency-heating to the conductive wire in each jointing portion by means of a high-frequency coil positioned around the case for simultaneously welding said jointing surfaces.

* * * * *